(12) United States Patent
Patel et al.

(10) Patent No.: US 7,521,398 B2
(45) Date of Patent: *Apr. 21, 2009

(54) SHALE HYDRATION INHIBITION AGENT AND METHOD OF USE

(75) Inventors: Arvind D. Patel, Sugarland, TX (US); Emanuel Stamatakis, Houston, TX (US)

(73) Assignee: M-I L.L.C., Houston, TX (US)

( * ) Notice: Subject to any disclaimer, the term of this patent is extended or adjusted under 35 U.S.C. 154(b) by 510 days.

This patent is subject to a terminal disclaimer.

(21) Appl. No.: 11/123,396

(22) Filed: May 6, 2005

(65) Prior Publication Data

US 2006/0073985 A1 Apr. 6, 2006

Related U.S. Application Data

(63) Continuation-in-part of application No. 10/958,635, filed on Oct. 5, 2004, now Pat. No. 7,312,183.

(51) Int. Cl.
*C09K 8/035* (2006.01)

(52) U.S. Cl. .................. 507/129; 507/239; 507/248

(58) Field of Classification Search .............. 507/129, 507/239, 248
See application file for complete search history.

(56) References Cited

U.S. PATENT DOCUMENTS

| | | | |
|---|---|---|---|
| 2,761,842 A * | 9/1956 | Brown et al. | 507/248 |
| 3,981,766 A * | 9/1976 | Pechhold | 162/161 |
| 5,190,683 A | 3/1993 | Evain et al. | |
| 6,017,854 A * | 1/2000 | Van Slyke | 507/118 |
| 6,390,141 B1 * | 5/2002 | Fisher et al. | 138/137 |
| 6,439,309 B1 * | 8/2002 | Matherly et al. | 166/276 |

OTHER PUBLICATIONS

International Search Report issued on Sep. 18, 2006 for PCT/US2005/035619, filed on Oct. 4, 2005.

* cited by examiner

*Primary Examiner*—James Seidleck
*Assistant Examiner*—Alicia M Toscano

(57) ABSTRACT

A method of using a water-base wellbore fluid in subterranean wells that penetrate through a subterranean formation containing a shale which swells in the presence of water. The well bore fluid includes, an aqueous based continuous phase, and a shale hydration inhibition agent. One illustrative shale hydration inhibition agent is preferably the reaction product of a hydrogenation reaction of the product of the reaction of an aromatic amine with an aldehyde, preferably formaldehyde. Alternatively the shale hydration inhibition agent may be the reaction product of a hydrogenation reaction of the product of the reaction of aniline and formaldehyde. In one illustrative embodiment, the shale hydration inhibition agent is selected from the class of compounds known as polycycloaliphatic amines. Further the shale hydration inhibition agent may be present in the form of a free-base or in the form of an acid salt of the disclosed amine compounds. The shale hydration inhibition agent is present in sufficient concentration to substantially reduce the swelling of shale drilling cuttings upon contact with the fluid.

7 Claims, No Drawings

SHALE HYDRATION INHIBITION AGENT AND METHOD OF USE

This is a continuation-in-part of U.S. patent application Ser. No. 10/958,635 filed Oct. 5, 2004, now U.S. Pat. No. 7,312,183 to which priority is claimed and the contents of which are hereby incorporated by reference.

BACKGROUND

In rotary drilling of subterranean wells numerous functions and characteristics are expected of a well bore fluid. A well bore fluid should circulate throughout the well and carry cuttings from beneath the bit, transport the cuttings up the annulus, and allow their separation at the surface. At the same time, the well bore fluid is expected to cool and clean the drill bit, reduce friction between the drill string and the sides of the hole, and maintain stability in the borehole's uncased sections. The well bore fluid should also form a thin, low permeability filter cake that seals openings in formations penetrated by the bit and act to reduce the unwanted influx of formation fluids from permeable rocks.

Well bore fluids are typically classified according to their base material. In oil base fluids, solid particles are suspended in oil, and water or brine may be emulsified with the oil. The oil is typically the continuous phase. In water base fluids, solid particles are suspended in water or brine, and oil may be emulsified in the water. The water is typically the continuous phase. Pneumatic fluids are a third class of well bore fluids in which a high velocity stream of air or natural gas removes drill cuttings.

Three types of solids are usually found in water base well bore fluids: 1) clays and organic colloids added to provide necessary viscosity and filtration properties; 2) heavy minerals whose function is to increase the well bore fluid's density; and 3) formation solids that become dispersed in the well bore fluid during the drilling operation.

The formation solids that become dispersed in a well bore fluid are typically the cuttings produced by the drill bit's action and the solids produced by borehole instability. Where the formation solids are clay minerals that swell, the presence of either type of formation solids in the well bore fluid can greatly increase drilling time and costs.

Clay minerals are generally crystalline in nature. The structure of a clay's crystals determines its properties. Typically, clays have a flaky, mica-type structure. Clay flakes are made up of a number of crystal platelets stacked face-to-face. Each platelet is called a unit layer, and the surfaces of the unit layer are called basal surfaces.

A unit layer is composed of multiple sheets. One sheet is called the octahedral sheet, it is composed of either aluminum or magnesium atoms octahedrally coordinated with the oxygen atoms of hydroxyls. Another sheet is called the tetrahedral sheet. The tetrahedral sheet consists of silicon atoms tetrahedrally coordinated with oxygen atoms.

Sheets within a unit layer link together by sharing oxygen atoms. When this linking occurs between one octahedral and one tetrahedral sheet, one basal surface consists of exposed oxygen atoms while the other basal surface has exposed hydroxyls. It is also quite common for two tetrahedral sheets to bond with one octahedral sheet by sharing oxygen atoms. The resulting structure, known as the Hoffman structure, has an octahedral sheet that is sandwiched between the two tetrahedral sheets. As a result, both basal surfaces in a Hoffman structure are composed of exposed oxygen atoms.

The unit layers stack together face-to-face and are held in place by weak attractive forces. The distance between corresponding planes in adjacent unit layers is called the c-spacing. A clay crystal structure with a unit layer consisting of three sheets typically has a c-spacing of about $9.5 \times 10^{-7}$ mm.

In clay mineral crystals, atoms having different valences commonly will be positioned within the sheets of the structure to create a negative potential at the crystal surface. In that case, a cation is adsorbed on the surface. These adsorbed cations are called exchangeable cations because they may chemically trade places with other cations when the clay crystal is suspended in water. In addition, ions may also be adsorbed on the clay crystal edges and exchange with other ions in the water.

The type of substitutions occurring within the clay crystal structure and the exchangeable cations adsorbed on the crystal surface greatly affect clay swelling, a property of primary importance in the well bore fluid industry. Clay swelling is a phenomenon in which water molecules surround a clay crystal structure and position themselves to increase the structure's c-spacing thus resulting in an increase in volume. Two types of swelling may occur.

Surface hydration is one type of swelling in which water molecules are adsorbed on crystal surfaces. Hydrogen bonding holds a layer of water molecules to the oxygen atoms exposed on the crystal surfaces. Subsequent layers of water molecules align to form a quasi-crystalline structure between unit layers, which results in an increased c-spacing. Virtually all types of clays swell in this manner.

Osmotic swelling is a second type of swelling. Where the concentration of cations between unit layers in a clay mineral is higher than the cation concentration in the surrounding water, water is osmotically drawn between the unit layers and the c-spacing is increased. Osmotic swelling results in larger overall volume increases than surface hydration. However, only certain clays, like sodium montmorillonite, swell in this manner.

Exchangeable cations found in clay minerals are reported to have a significant impact on the amount of swelling that takes place. The exchangeable cations compete with water molecules for the available reactive sites in the clay structure. Generally cations with high valences are more strongly adsorbed than ones with low valences. Thus, clays with low valence exchangeable cations will swell more than clays whose exchangeable cations have high valences.

In the North Sea and the United States Gulf Coast, drillers commonly encounter argillaceous sediments in which the predominant clay mineral is sodium montmorillonite (commonly called "gumbo shale"). Sodium cations are predominately the exchangeable cations in gumbo shale. As the sodium cation has a low positive valence (i.e. formally a +1 valence), it easily disperses into water. Consequently, gumbo shale is notorious for its swelling.

Clay swelling during the drilling of a subterranean well can have a tremendous adverse impact on drilling operations. The overall increase in bulk volume accompanying clay swelling impedes removal of cuttings from beneath the drill bit, increases friction between the drill string and the sides of the borehole, and inhibits formation of the thin filter cake that seals formations. Clay swelling can also create other drilling problems such as loss of circulation or stuck pipe that slow drilling and increase drilling costs. Thus, given the frequency in which gumbo shale is encountered in drilling subterranean wells, the development of a substance and method for reducing clay swelling remains a continuing challenge in the oil and gas exploration industry.

One method to reduce clay swelling is to use salts in well bore fluids. Salts generally reduce the swelling of clays. However, salts flocculate the clays resulting in both high fluid losses and an almost complete loss of thixotropy. Further, increasing salinity often decreases the functional characteristics of well bore fluid additives.

Another method for controlling clay swelling is to use organic shale inhibitor molecules in well bore fluids. It is believed that the organic shale inhibitor molecules are adsorbed on the surfaces of clays with the added organic shale inhibitor competing with water molecules for clay reactive sites and thus serve to reduce clay swelling. One reported shale inhibitor is the use of water soluble diamine compounds, such as primary diamines with a chain length of 8 or less and primary alkyl amines with a chain length of 4 or less. However, these amine compounds are less desirable at higher temperatures and pressures. Further one of skill in the art would understand that the amine compounds disclosed have a low molecular weight and thus the ratio of hydrophilic to lipophilic portions of the molecule favors the hydrophilic amine moiety. Thus compounds having a greater carbon number are not desirable because of the lipophilic nature of the molecule.

In view of the above, one of skill in the art would appreciate and understand that there remains a continuing need for new shale hydration inhibition agents within the art.

SUMMARY

Upon consideration of the present disclosure, one of skill in the art should understand and appreciate that one illustrative embodiment of the claimed subject matter includes a water-base wellbore fluid for use in subterranean wells that penetrate through a subterranean formation containing a shale which swells in the presence of water. In such an illustrative embodiment, the well bore fluid includes, an aqueous based continuous phase, and a shale hydration inhibition agent. One illustrative shale hydration inhibition agent is preferably the reaction product of a hydrogenation reaction of the product of the reaction of an aromatic amine with an aldehyde, preferably formaldehyde. Alternatively the shale hydration inhibition agent may be the reaction product of a hydrogenation reaction of the product of the reaction of aniline and formaldehyde. In one illustrative embodiment, the shale hydration inhibition agent is selected from the class of compounds known as polycycloaliphatic amines. Further the shale hydration inhibition agent may be present in the form of a free-base or in the form of an acid salt of the disclosed amine compounds. The shale hydration inhibition agent is present in sufficient concentration to substantially reduce the swelling of shale drilling cuttings upon contact with the fluid.

The illustrative fluid is formulated such that it optionally includes viscosifying agents and/or weighting agents which should be well known to one of skill in the art of formulating wellbore fluids. In addition the aqueous based continuous phase may be selected from: fresh water, sea water, brine, mixtures of water and water soluble organic compounds as well as mixtures and combinations of these and similar aqueous based fluids that should be known to one of skill in the art. In one illustrative embodiment, an optional viscosifying agent is included in the fluid and the viscosifying agent is preferably selected from mixtures and combinations of compounds that should be known to one of skill in the art such as xanthan gums, starches, modified starches and synthetic viscosifiers such as polyacrylamides, and the like. A weighting material such as barite, calcite, hematite, iron oxide, calcium carbonate, organic and inorganic salts, as well as mixtures and combinations of these and similar compounds that should be known to one of skill in the art may optionally be included into the formulation of the illustrative fluid. The illustrative fluid may also include a wide variety of conventional components of aqueous based well bore fluids, such as fluid loss control agents, suspending agents, viscosifying agents, rheology control agents, as well as other compounds and materials that one of skill in the art would be knowledgeable about.

The scope of the claimed subject matter also encompasses a fracturing fluid for use in a subterranean well in which the subterranean well penetrates through one or more subterranean formation composed of shale that swells in the presence of water. One illustrative fluid is formulated to include an aqueous based continuous phase, a viscosifying agent and the shale hydration inhibition agents disclosed herein and which are present in sufficient concentration to substantially reduce the swelling of shale.

The scope of the claimed subject matter also encompasses water based fluids which will form a semipermeable membrane over a shale formation to increase wellbore stability. This result is achieved by carefully selecting the amine and then adjusting the pH or crosslinking with other components resulting in a precipitation of the amine which then forms a membrane over the surface of the rock formation and thus stabilizing the wellbore.

It should also be appreciated that the claimed subject matter inherently includes components such as: an aqueous based continuous phase; a swellable shale material; and a shale hydration inhibition agent as substantially described herein, and present in sufficient concentration to substantially reduce the swelling of the swellable shale material. Such a composition may be formed during the course of drilling a subterranean well, but also may be deliberately made if drill cuttings reinjection is to be carried out.

One of skill in the art should appreciate that the fluids of the claimed subject matter are useful during the course of the drilling, completing, cementing, fracturing, maintenance and production, workover, abandonment of a well and other operations associated with subterranean wells. The claimed subject matter also includes a method of disposing of drill cuttings into a subterranean formation as part of a process well known in the industry as cutting reinjection. It should also be appreciated by one of skill in the art that the claimed subject matter inherently includes a method of reducing the swelling of shale clay in a well, the method including circulating in the well a water-base well bore fluid formulated as is substantially disclosed herein. These and other features of the claimed subject matter are more fully set forth in the following description of illustrative embodiments of the claimed subject matter.

DETAILED DESCRIPTION

The claimed subject matter is directed to a water-base well bore fluid for use in subterranean wells that penetrate through a formation containing shale which swells in the presence of water. Generally the well bore fluid of the claimed subject matter may be formulated to include an aqueous continuous phase and a shale hydration inhibition agent, preferably an organic amine compound. As disclosed below, the well bore fluids of the claimed subject matter may optionally include additional components, such as weighting agents, viscosity agents, fluid loss control agents, bridging agents, lubricants, anti-bit balling agents, neutralizing agents, corrosion inhibition agents, alkali reserve materials and pH buffering agents, surfactants and suspending agents, rate of penetration enhancing agents, proppants, sand for gravel packing, and other similar solids, and the like that one of skill in the art should understand may be added to an aqueous based well bore fluid.

The aqueous based continuous phase may generally be any water based fluid phase that is compatible with the formulation of a well bore fluid and is compatible with the shale hydration inhibition agents disclosed herein. To solubilize the shale hydration inhibition agents disclosed herein, the amine functional group may require protonation prior to or during drilling operations to make it functionally active. Alternatively, the shale hydration inhibition agent may derivatized by the addition of polar organic functional groups, such as alkoxy, hydroxyl, carboxy or other functional groups that are known to enhance the solubility of organic compounds in water. In one preferred embodiment, the aqueous based continuous phase is selected from: fresh water, sea water, brine, mixtures of water and water soluble organic compounds and mixtures thereof. The amount of the aqueous based continuous phase should be sufficient to form a water based well bore fluid. This amount may range from nearly 100% of the well bore fluid to less than 1% of the well bore fluid by volume. Preferably, the aqueous based continuous phase is from about 99% to about 20% by volume and preferably from about 90 to about 40% by volume of the well bore fluid.

One of skill in the art of drilling fluid formulation should understand and appreciate that a shale hydration inhibition agent is included in the formulation of the well bore fluids of the claimed subject matter so that the hydration of shale, shale-like and clay containing formations is inhibited. As the term is used herein, shale is intended to mean all shale, shale like and clay containing subterranean formations that exhibit an undesirable reaction (such as swelling, disassociation, dispersion, etc. . . . ) upon exposure to aqueous based fluids. Thus, the shale hydration inhibition agent should be present in sufficient concentration to reduce either or both the surface hydration based swelling and/or the osmotic based swelling of the shale/clay. The exact amount of the shale hydration inhibition agent present in a particular well bore fluid formulation can be determined by a trial and error method of testing the combination of well bore fluid and a representative sample of formation encountered. Generally however, the shale hydration inhibition agent of the claimed subject matter may be used in well bore fluids in a concentration from about 0.5 to about 20 pounds per barrel (lbs/bbl or ppb) and more preferably in a concentration from about 2 to about 12 pounds per barrel of well bore fluid.

As previously noted, the shale hydration inhibition agents of the claimed subject matter are preferably lipophilic amine compounds. This is in contrast with many of the compounds of the prior art which are hydrophilic (i.e. at least partially soluble in water.). One of skill in the art should note that some of the strongly lipophilic amines disclosed herein may be solubilized by the functionalization of one or more amine groups. An example is the partial protonation of the amine functional group. Such protonation may be carried out by addition of acid or by adjusting the pH of the well bore fluid to a predetermined value. Alternatively, the shale hydration inhibition agents disclosed herein can be partially or fully protonated or neutralized prior to their application in drilling operations. In place of protonation, the amine group may be functionalized by a small organic group containing 1-3 carbon atoms. As a further alternative, the amine group may be functionalized by use of organic groups that are easily hydrolyzed in the downhole environment. For instance, amide, hydroxy amide, imine, or other such functionality may be introduced to affect the solubility of the shale hydration inhibition compounds disclosed herein.

In one illustrative embodiment, the shale hydration inhibition agent of the claimed subject matter should have the general formula:

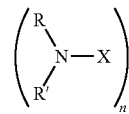

in which R and R' are independently selected from hydrogen, methyl, ethyl or propyl and X is a C5 to C12 bridging group and n is an integer from 1 to 8. One illustrative amine that serves as a shale hydration inhibition agent is where X is a cyclohexyl group or other similar long chain or cycloalkyl or cycloaryl group. In such instances the amine may be a primary, secondary or tertiary amine. For example cylcohexyl amine, N-methyl cyclohexyl amine and N,N-dimethyl cyclohexyl amine have all been found to be effective shale hydration inhibition agents. In the present illustrative embodiment, the shale hydration inhibition agent may be in the free-base or acid salt form or some combination of the two.

In another illustrative shale hydration inhibition agent is preferably the reaction product of a hydrogenation reaction of the product of the reaction of an aromatic amine with an aldehyde, preferably formaldehyde. Alternatively the shale hydration inhibition agent may be the reaction product of a hydrogenation reaction of the product of the reaction of aniline and formaldehyde. In one illustrative embodiment, the shale hydration inhibition agent is selected from compounds having the generalized structure:

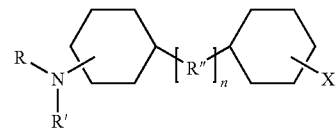

in which R and R' independently selected from hydrogen, methyl, ethyl or propyl, R" is a bridging group having 1 to 20 carbon atoms and n has a value from 1 to 4 and X is an amine, hydroxyl, alkoxy, carboxy group. The shale hydration agent may be present in the form of the free-base or the acid salt of the base or some combination of the two. In one preferred embodiment, the bridging group is selected from the aliphatic and aryl groups with or without additional functionality. Further it should be noted that the amine group may be either in the ortho, meta or para position relative to the bridging group, however, the para position is preferred. Thus a preferred illustrative embodiment the shale hydration inhibition agent has the generalized formula:

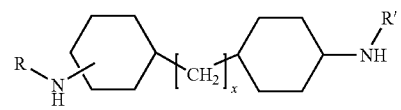

in which in which R and R' independently selected from hydrogen, methyl, ethyl or propyl, and X has a value from 1 to 6. The shale hydration agent may be present in the form of the free-base or the acid salt of the base or some combination of the two.

A further illustrative embodiment of the shale hydration inhibition agents of the claimed subject matter include compounds generally known as mixed polycycloaliphatic amines (MPCA). MPCA is a commercially available mixture of compounds including aminoalkylcyclohexyl amines, aminoaralkylcyclohexyl amines and other such compounds. They are known for use in coatings, lube oil additives and corrosion inhibitors. Exemplary compounds that may be found in this mixture include compounds having the formula:

| Compound | Structure |
|---|---|
| A | H₂N—⬡—CH₂—⬡—NH₂ |
| B | H₂N—⬡—CH₂—⌬—NH₂ |
| C | H₂N—⬡—CH₂—⬡—OH |
| D | H₂N—⬡—⬡(NH₂)—CH₂—⬡—NH₂ |
| E | H₂N—⬡—CH₂—⌬(NH₂)—CH₂—⬡—NH₂ |
| F | H₂N—⬡—⬡—NH—⬡—CH₂—⬡—NH₂ |
| G | H₂N—⬡—CH₂—⌬(NH₂)—CH₂—⌬(NH₂)—CH₂—⬡—NH₂ |

The percent compositional ranges for the above exemplary constituents of MPCA may vary considerably depending upon the source of the material. In one illustrative embodiment the MPCA mixture contains the following:

| Compound | Compositional Range (%) |
|---|---|
| A | 2-10 |
| B | 5-17 |
| C | 0.5-2 |
| D | 15-22 |
| E | 33-50 |
| F | 8-20 |
| G | 3-8 |

It is contemplated that from this mixture one or more compounds may be found to have an especially good ability to function as a shale inhibition agent. One of skill in the art could make this determination by simply purifying/isolating each compound and then testing the shale inhibition properties of the isolated compound. Such routine experimentation is well within the skill of one in the chemical arts and thus is considered to be within the scope of the present invention.

As shown in the above formulas, the illustrative shale hydration inhibition agents are free base amines (i.e. unprotonated). One of skill in the art should appreciate that the shale hydration inhibition agents of the claimed subject matter may be partially or fully protonated depending upon the pH of the well bore fluid during or prior to use. Further it should be appreciated that the protonation state of the amine can be easily adjusted during or prior to use by simply adjusting the pH of the well bore fluid. Illustrative examples of protic acids that might be useful include both mineral acids (i.e. hydrochloric, hydrobrmic, sulfuric, nitric, and other such acids) and organic acids (i.e. carboxylic acids, formic, acetic, propionic, butyric, citric, halogenated carboxylic acids, sulfonate and phosphonate organic compounds, and other similar acids). In one preferred embodiment, simple carboxylic acids are reacted with the shale inhibitors to increase the solubility of the material in aqueous solutions. Other organic acids that function as chelating agents may be useful as well. For instance, ethylene diaminetetraacetate (EDTA), ethylenediaminetetraacetic acid (EDTA), cyclohexylene dinitrilo tetraacetic acid (CDTA), [ethylenebis(oxyethylenenitrilo)]tetraacetic acid (EGTA) and [[(carboxymethyl)imino]-bis (ethylenenitrilo)]-tetra-acetic acid, hydroxyethylethylenediaminetriacetic acid (HEDTA) and hydroxyethyliminodiacetic acid (HEIDA) as well as the mono cationic and dicationic salts of these compounds. It should be appreciated by one of skill in the art that by routine trial and error a skilled person can select an acid material utilized to neutralize the amine functional groups, and thus substantially affect the solubility of the shale inhibition agents disclosed herein. Such concepts are within the scope of the present disclosure. Thus in a generalized illustrative embodiment, the shale hydration inhibition agents of the present invention may have the formula:

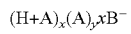

in which A represents an amine functional group on the compounds disclosed herein, H$^+$A represents a protonated amine functional group on the shale hydration inhibition agents disclosed herein, x represents the molar equivalents of acid and x+y equals the number of amine functional groups present. One illustrative embodiment of such a compound includes the reaction product of a predetermined amount of carboxylic acid, preferably formic, acetic or propionic acid and MPCA. The reaction product may be isolated as an amine salt, or the resulting solution may be used directly in formulating the well bore fluids disclosed herein. Another illustrative embodiment the shale hydration inhibition agents having the formula:

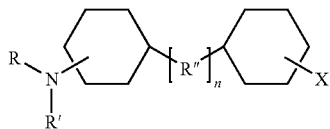

in which R and R' independently selected from hydrogen, methyl, ethyl or propyl, R" is a bridging group having 1 to 20 carbon atoms and n has a value from 1 to 4 and X is an amine, hydroxyl, alkoxy, carboxy group, in which at least one of the amine functional groups have been reacted with a predetermined amount of C1 to C25 carboxylic acid. In one preferred embodiment, the bridging group is selected from the aliphatic and aryl groups with or without additional functionality. As with the free-base material, the amine group may be either in the ortho, meta or para position relative to the bridging group, however, the para position is preferred.

The well bore fluids of the claimed subject matter can include a weight material in order to increase the density of the fluid. The primary purpose for such weighting materials is to increase the density of the well bore fluid so as to prevent kick-backs and blow-outs. One of skill in the art should know and understand that the prevention of kick-backs and blow-outs is important to the safe day to day operations of a drilling rig. Thus the weight material is added to the well bore fluid in a functionally effective amount largely dependent on the nature of the formation being drilled. Weight materials suitable for use in the formulation of the well bore fluids of the claimed subject matter may be generally selected from any type of weighting materials be it in solid, particulate form, suspended in solution, dissolved in the aqueous phase as part of the preparation process or added afterward during drilling. It is preferred that the weight material be selected from the group including barite, hematite, iron oxide, calcium carbonate, magnesium carbonate, organic and inorganic salts, and mixtures and combinations of these compounds and similar such weight materials that may be utilized in the formulation of well bore fluids.

The well bore fluids of the claimed subject matter can include a viscosifying agent in order to alter or maintain the rheological properties of the fluid. The primary purpose for such viscosifying agents is to control the viscosity and potential changes in viscosity of the well bore fluid. Viscosity control is particularly important because often a subterranean formation may have a temperature significantly higher than the surface temperature. Thus a well bore fluid may undergo temperature extremes of nearly freezing temperatures to nearly the boiling temperature of water or higher during the course of its transit from the surface to the drill bit and back. One of skill in the art should know and understand that such changes in temperature can result in significant changes in the rheological properties of fluids. Thus in order to control and/or moderate the rheology changes, viscosity agents and rheology control agents may be included in the formulation of the well bore fluid. Viscosifying agents suitable for use in the formulation of the well bore fluids of the claimed subject matter may be generally selected from any type of viscosifying agents suitable for use in aqueous based well bore fluids. In one illustrative embodiment, a viscosifying agent is included in the well bore fluid and the viscosifying agent is preferably selected mixtures and combinations of compounds that should be known to one of skill in the art such as xanthan gums, starches, modified starches and synthetic viscosifiers such as polyacrylamides, and the like as well as organophilic bentonite, sepiolite, clay, and attapulgite clay.

In addition to the components noted above, the claimed well bore fluids may also be formulated to include materials generically referred to as alkali reserve and alkali buffering agent, pH buffering agents, thinners, and fluid loss control agents, as well as other compounds and materials which are optionally added to water base well bore fluid formulations. Of these additional materials, each can be added to the formulation in a concentration as rheologically and functionally required by drilling conditions.

One of skill in the art should appreciate that lime is the common alkali reserve agent utilized in formulating water based well bore fluids. Alkali buffering agents, such as cyclic organic amines, sterically hindered amines, amides of fatty acids and the like may also be included to serve as a buffer against the loss of the alkali reserve agent. The well bore fluid may contain amine protonating or pH buffering agents to solubilize the shale inhibition agents and thus increase their activity. The well bore fluid may also contain anticorrosion agents as well to prevent corrosion of the metal components of the drilling operational equipment. Thinners such as lignosulfonates are also often added to water-base well bore fluids. Typically lignosulfonates, modified lignosulfonates, polyphosphates and tannins are added. In other embodiments, low molecular weight polyacrylates can also be added as thinners. Thinners are added to a well bore fluid to reduce flow resistance and control gelation tendencies. Other functions performed by thinners include reducing filtration and filter cake thickness, counteracting the effects of salts, minimizing the effects of water on the formations drilled, emulsifying oil in water, and stabilizing mud properties at elevated temperatures.

A variety of fluid loss control agents may be added to the well bore fluids of the claimed subject matter that are generally selected from a group consisting of synthetic organic polymers, biopolymers, and mixtures thereof. The fluid loss control agents such as modified lignite, polymers, modified starches and modified celluloses may also be added to the water base well bore fluid system of this invention. In one embodiment it is preferred that the additives of the invention should be selected to have low toxicity and to be compatible with common anionic well bore fluid additives such as polyanionic carboxymethylcellulose (PAC or CMC), polyacrylates, partially-hydrolyzed polyacrylamides (PHPA), lignosulfonates, xanthan gum, mixtures of these and the like.

The well bore fluid of the claimed subject matter may further contain an encapsulating agent generally selected from the group consisting of synthetic organic, inorganic and bio-polymers and mixtures thereof. The role of the encapsulating agent is to absorb at multiple points along the chain onto the clay particles, thus binding the particles together and encapsulating the cuttings. These encapsulating agents help improve the removal of cuttings with less dispersion of the cuttings into the well bore fluids. The encapsulating agents may be anionic, cationic, amphoteric, or non-ionic in nature. In one illustrative embodiment, a partially hydrolyzed polyacrylamide with cationic character is utilized as an encapsulating agent.

Other additives that could be present in the well bore fluids of the claimed subject matter include products such as lubricants, penetration rate enhancers, defoamers, fluid loss circulation materials, propants, sized sand, as well as other materials that do not have a substantial impact on the shale hydration inhibition properties of the fluids disclosed herein. Such compounds should be known to one of ordinary skill in the art of formulating aqueous based well bore fluids.

The following examples are included to demonstrate preferred embodiments of the claimed subject matter. It should be appreciated by those of skill in the art that the techniques disclosed in the examples which follow represent techniques discovered by the inventors to function well in the practice of the claimed subject matter, and thus can be considered to constitute preferred modes for its practice. However, those of skill in the art should, in light of the present disclosure, appreciate that many changes can be made in the specific embodiments which are disclosed and still obtain a like or similar result without departing from the scope of the claimed subject matter.

Unless otherwise stated, all starting materials are commercially available and standard laboratory techniques and equipment are utilized. The tests were conducted in accordance with the procedures in API Bulletin RP 13B-2, 1990. The following abbreviations are sometimes used in describing the results discussed in the examples:

"PV" is plastic viscosity (CPS) which is one variable used in the calculation of viscosity characteristics of a well bore fluid.

"YP" is yield point (lbs/100 ft$^2$) which is another variable used in the calculation of viscosity characteristics of well bore fluids.

"GELS" (lbs/100 ft$^2$) is a measure of the suspending characteristics and the thixotropic properties of a well bore fluid.

"F/L" is API fluid loss and is a measure of fluid loss in milliliters of well bore fluid at 100 psi.

EXAMPLE 1

The following drilling muds are formulated to illustrate the claimed subject matter:

|  | Base Mud | 1 | 2 |
|---|---|---|---|
| Fresh Water | 276 | 276 | 276 |
| Duovis | 1.0 | 1.0 | 1.0 |
| Unitrol | 3.0 | 3.0 | 3.0 |
| UltraCap | 2.0 | 2.0 | 2.0 |
| 4,4'-diaminodicyclohexylmethane | — | 10.5 | — |
| Cyclohexylamine | — | — | 10.5 |
| Barite | 201 | 201 | 201 |
| pH Adjusted (Acetic Acid) | 9.4 | 9.4 | 9.4 |

In the above mud formulation the following commercially available compounds have been used in the formulation of the well bore fluid, but one of skill in the art should appreciate that other similar compounds may be used instead.

| UltraCap | M-I SWACO, Houston TX |
| UltraFree | M-I SWACO, Houston TX |
| Unitrol | M-I SWACO, Houston TX |
| Duo Vis | Kelco Oil Field Group |

The properties of the above muds as well as a base mud (i.e. a mud in which there is no shale hydration inhibition agent) are measured and give the following exemplary data:

| Properties Viscosity (cps) at Ambient Temperature | Base Mud | 1 | 2 |
|---|---|---|---|
| 600 rpm | 136 | 115 | 109 |
| 300 rpm | 101 | 84 | 76 |
| 200 rpm | 85 | 74 | 63 |
| 100 rpm | 58 | 48 | 43 |
| 6 rpm | 16 | 13 | 12 |
| 3 rpm | 11 | 10 | 10 |
| Gels 10 sec. | 12 | 12 | 12 |
| 10 min. | 16 | 14 | 13 |
| PV | 35 | 31 | 33 |
| YP | 66 | 53 | 43 |
| API F/L | 3.8 | 3.0 | 3.2 |

Dispersion tests are run with Oxford Clay cuttings by hot rolling 10 g of cuttings in a one-barrel equivalent of mud for 16 hours at 150° F. After hot rolling the remaining cuttings are screened using a 20 mesh screen and washed with 10% potassium chloride water, dried and weighed to obtain the percentage recovered. The results of this evaluation are given in the following Table and shows the improved shale inhibition performance of shale hydration inhibition agent of this invention.

|  | (% cuttings recovered) | | |
|---|---|---|---|
|  | Base Mud | 1 | 2 |
| Oxford Clay | 88 | 98 | 94 |

To further demonstrate the performance of the well bore fluids formulated in accordance with the teachings of this invention, a test using a bulk hardness tester is conducted. A BP Bulk Hardness Tester is a device designed to give an assessment of the hardness of shale cuttings exposed to well bore fluids, which in turn can be related to the inhibiting properties of the well bore fluid being evaluated. In this test, shale cuttings are hot rolled in the test well bore fluid at 150° F. for 16 hours. Shale cuttings are screened and then placed into a BP Bulk Hardness Tester. The equipment is closed and using a torque wrench the force used to extrude the cuttings through a plate with holes in it is recorded. Depending on the hydration state and hardness of the cuttings and the well bore fluid used, a plateau region in torque is reached as extrusion of the cuttings begins to take place. Alternatively, the torque may continue to rise which tends to occur with harder cutting samples. Therefore, the higher the torque number obtained, the more inhibitive the well bore fluid system is considered. Illustrative data obtained using the three different mud formulations with Oxford clay cuttings are given below.

| Oxford Clay Turn No. | Bulk Hardness: (values in inch/lbs) Mud Formulation | | |
|---|---|---|---|
| | Base Mud | 1 | 2 |
| 3 | — | 5 | — |
| 4 | — | 10 | 5 |
| 5 | 5 | 15 | 5 |
| 6 | 5 | 30 | 10 |
| 7 | 10 | 50 | 15 |
| 8 | 10 | 95 | 40 |
| 9 | 10 | 190 | 100 |
| 10 | 10 | 225 | 120 |
| 11 | 10 | D | 135 |
| 12 | 15 | | 150 |
| 13 | 15 | | 165 |
| 14 | 15 | | 170 |
| 15 | 15 | | 190 |
| 16 | 15 | | 200 |
| 17 | 20 | | 225 |
| 18 | 25 | | R, D |
| 19 | 225 R | | |

In the above table, D indicates formation of a disk; R indicates the formation of spaghetti like ribbons.

Upon review of the above data, one skilled in the art should observe that well bore fluids formulated according to the teachings of this invention prevent the hydration of various types of shale clays and thus are likely to provide good performance in drilling subterranean wells encountering such shale clays.

EXAMPLE 2

The following testing was conducted to demonstrate the maximum amount of API bentonite that can be inhibited by a single 10.5 ppb treatment of shale hydration inhibition agents of the claimed subject matter over a period of days. This test procedure uses pint jars that are filed with one barrel equivalent of tap water and 10.5 ppb of a shale hydration inhibition agent. Tap water was used as a control sample. All samples were adjusted to at least a pH of 9.5 with hydrochloric acid and treated with a 10 ppb portion of M-I GEL (API bentonite) at a medium sheer rate. After stirring for 30 minutes, the samples were heat aged overnight at 150° F. After the samples were cooled, their rheologies were recorded at ambient temperature. This procedure was carried out for each sample until all were too thick to measure. The tables below present representative data that shows the shale hydration inhibition effect of the claimed subject matters by the daily addition of bentonite in tap water treated with the shale hydration inhibition agents indicated at the top of each column. For purposes of the following example, the following shale hydration inhibition agents are utilized:

| Additive Code | Chemical |
|---|---|
| A | 4,4'-diaminodicyclohexylmethane |
| B | Cylcohexylamine (CHA) |
| C | N-methyl cyclohexylamine |
| D | N,N-dimethyl cyclohexylamine |

| Bentonite (llb/bbl) | 600 rpm Rheology Data (centipoises) | | | | | | |
|---|---|---|---|---|---|---|---|
| | Base | KCl | Choline Chloride | A | B | C | D |
| 50 | TTTM | 20 | 3 | 6 | 7 | 6 | 8 |
| 70 | | 170 | 24 | 9 | 12 | 8 | 10 |
| 90 | | TTTM | 85 | 12 | 14 | 13 | 14 |
| 110 | | | TTTM | 17 | 18 | 21 | 25 |
| 130 | | | | 27 | 29 | 29 | 35 |
| 150 | | | | 47 | 47 | 36 | 48 |
| 170 | | | | 67 | 54 | 71 | 113 |
| 190 | | | | 139 | 102 | 97 | 143 |
| 200 | | | | 165 | 123 | 103 | 250 |
| 210 | | | | 254 | 160 | 109 | TTTM |
| 220 | | | | TTTM | 201 | 157 | |
| 230 | | | | | TTTM | 277 | |
| 240 | | | | | | TTTM | |

In the above table the abbreviation TTTM means too thick to measure.

| Bentonite (llb/bbl) | 6 rpm Rheology Data (centipoises) | | | | | | |
|---|---|---|---|---|---|---|---|
| | Base | KCl | Choline Chloride | A | B | C | D |
| 50 | TTTM | 12 | 3 | 1 | 1 | 1 | 2 |
| 70 | | 140 | 13 | 2 | 2 | 2 | 2 |
| 90 | | TTTM | 32 | 2 | 2 | 2 | 3 |

-continued

| | | | 6 rpm Rheology Data (centipoises) | | | | |
|---|---|---|---|---|---|---|---|
| Bentonite (llb/bbl) | Base | KCl | Choline Chloride | A | B | C | D |
| 110 | | | TTTM | 3 | 5 | 4 | 6 |
| 130 | | | | 7 | 8 | 8 | 9 |
| 150 | | | | 19 | 13 | 12 | 17 |
| 170 | | | | 21 | 18 | 17 | 34 |
| 190 | | | | 46 | 32 | 24 | 36 |
| 200 | | | | 53 | 36 | 25 | 41 |
| 210 | | | | 77 | 47 | 26 | 131 |
| 220 | | | | TTTM | 60 | 47 | TTTM |
| 230 | | | | | 161 | 98 | |
| 240 | | | | | TTTM | TTTM | |

In the above table the abbreviation TTTM means too thick to measure.

| | | | 10 Min. Gels | | | | |
|---|---|---|---|---|---|---|---|
| Bentonite (llb/bbl) | Base | KCl | Choline Chloride | A | B | C | D |
| 50 | TTTM | 24 | 2 | 2 | 2 | 2 | 2 |
| 70 | | 297 | 9 | 2 | 2 | 3 | 3 |
| 90 | | TTTM | 31 | 2 | 3 | 3 | 3 |
| 110 | | | TTTM | 6 | 5 | 4 | 5 |
| 130 | | | | 7 | 6 | 8 | 9 |
| 150 | | | | 13 | 10 | 8 | 14 |
| 170 | | | | 18 | 14 | 12 | 23 |
| 190 | | | | 39 | 25 | 18 | 34 |
| 200 | | | | 52 | 31 | 25 | 83 |
| 210 | | | | 86 | 37 | 28 | 129 |
| 220 | | | | TTTM | 62 | 47 | TTTM |
| 230 | | | | | 168 | 119 | |
| 240 | | | | | TTTM | TTTM | |

In the above table the abbreviation TTTM means too thick to measure.

| | | | Plastic Viscosity | | | | |
|---|---|---|---|---|---|---|---|
| Bentonite (llb/bbl) | Base | KCl | Choline Chloride | A | B | C | D |
| 50 | TTTM | 7 | 3 | 3 | 4 | 3 | 4 |
| 70 | | 20 | 5 | 4 | 6 | 3 | 4 |
| 90 | | TTTM | 20 | 5 | 5 | 5 | 6 |
| 110 | | | TTTM | 6 | 6 | 8 | 8 |
| 130 | | | | 10 | 10 | 9 | 8 |
| 150 | | | | 12 | 17 | 8 | 9 |
| 170 | | | | 12 | 14 | 16 | 17 |
| 190 | | | | 21 | 25 | 20 | 45 |
| 200 | | | | 30 | 32 | 27 | 50 |
| 210 | | | | 56 | 44 | 33 | TTTM |
| 220 | | | | TTTM | 53 | 53 | |
| 230 | | | | | TTTM | 55 | |
| 240 | | | | | | TTTM | |

In the above table the abbreviation TTTM means too thick to measure.

| Bentonite (llb/bbl) | Base | KCl | Choline Chloride | A | B | C | D |
|---|---|---|---|---|---|---|---|
| | | | Yield Point | | | | |
| 50 | TTTM | 8 | 4 | 0 | 0 | 0 | 0 |
| 70 | | 132 | 12 | 1 | 0 | 2 | 2 |
| 90 | | TTTM | 65 | 2 | 4 | 3 | 2 |
| 110 | | | TTTM | 5 | 6 | 5 | 9 |
| 130 | | | | 7 | 7 | 11 | 19 |
| 150 | | | | 23 | 17 | 20 | 30 |
| 170 | | | | 43 | 26 | 39 | 79 |
| 190 | | | | 97 | 52 | 57 | 53 |
| 200 | | | | 105 | 59 | 51 | 59 |
| 210 | | | | 142 | 72 | 40 | TTTM |
| 220 | | | | TTTM | 95 | 51 | |
| 230 | | | | | TTTM | 167 | |
| 240 | | | | | | TTTM | |

In the above table the abbreviation TTTM means too thick to measure.

Upon review of the above representative data, one of skill in the art should observe that well bore fluids formulated according to the teachings of the disclosure substantially inhibit the hydration of various shale clays and thus are likely to provide good performance in drilling subterranean wells encountering such shale clays.

EXAMPLE 3

In this example, 3% by weight of 4,4'-dimethyldicyclohexylmethane was dissolved into 1.5% glacial acetic acid solution in distilled water. A clear solution formed upon stirring the mixture. To this resulting solution a sufficient amount of 1.0 N sodium hydroxide was added to bring the pH to about 10.5. A white precipitate formed at this pH. The precipitate could be redissolved upon adjusting the pH to about 9.5.

The above example illustrates that a preferred shale hydration inhibition agent of the present disclosure can be precipitated out of solution and onto shale surfaces by adjusting the pH. One of skill in the art should appreciate that the ability to form this precipitate will prompt the formation of a membrane that should enhance well stability.

EXAMPLE 4

The following testing was conducted to demonstrate the maximum amount of API bentonite that can be inhibited by a single 10.5 ppb treatment of shale hydration inhibition agents of the claimed subject matter over a period of days. This test procedure uses pint jars that are filed with one barrel equivalent of tap water and 10.5 ppb of a shale hydration inhibition agent. Tap water was used as a control sample. All samples were adjusted to at least a pH of 9.5 with hydrochloric acid and treated with a 10 ppb portion of M-I GEL (API bentonite) at a medium sheer rate. After stirring for 30 minutes, the samples were heat aged overnight at 150° F. After the samples were cooled, their rheologies were recorded at ambient temperature. This procedure was carried out for each sample until all were too thick to measure. The tables below present representative data that shows the shale hydration inhibition effect of the claimed subject matters by the daily addition of bentonite in tap water treated with the shale hydration inhibition agents indicated at the top of each column. In the present example 10.5 ppb of MPCA was used to inhibit the total amount of bentonite. MPCA was neutralized with HCl, according to procedure described in Example 2 of this invention.

The following tables present exemplary results comparing the shale hydration inhibition performance of MPCA with potassium chloride and choline chloride:

| Bentonite (lbs/bbl) | Base | KCl | Choline Chloride | MPCA Neutralized (pH 9.5) |
|---|---|---|---|---|
| | | 600 rpm rpm Rheology Data (centipoises) | | |
| 50 | TTTM | 20 | 3 | 7 |
| 70 | | 170 | 24 | 10 |
| 90 | | TTTM | 85 | 17 |
| 110 | | | TTTM | 40 |
| 130 | | | | 64 |
| 150 | | | | 161 |
| 160 | | | | 173 |
| 170 | | | | 197 |
| 180 | | | | TTTM |
| | | 10 min gel | | |
| 50 | TTTM | 24 | 2 | 2 |
| 70 | | 297 | 9 | 4 |
| 90 | | TTTM | 31 | 6 |
| 110 | | | TTTM | 13 |
| 130 | | | | 25 |
| 150 | | | | 55 |
| 160 | | | | 89 |
| 170 | | | | 157 |
| 180 | | | | TTTM |
| | | Plastic Viscosity | | |
| 50 | TTTM | 7 | 3 | 3 |
| 70 | | 20 | 5 | 4 |
| 90 | | TTTM | 20 | 5 |
| 110 | | | TTTM | 8 |
| 130 | | | | 12 |
| 150 | | | | 19 |
| 160 | | | | 16 |
| 170 | | | | 43 |
| 180 | | | | TTTM |
| | | Yield Point | | |
| 50 | TTTM | 8 | 4 | 1 |
| 70 | | 132 | 12 | 2 |
| 90 | | TTTM | 65 | 7 |
| 110 | | | TTTM | 24 |
| 130 | | | | 40 |
| 150 | | | | 123 |

-continued

| Bentonite (lbs/bbl) | Base | KCl | Choline Chloride | MPCA Neutralized (pH 9.5) |
|---|---|---|---|---|
| 160 | | | | 141 |
| 170 | | | | 111 |
| 180 | | | | TTTM |

In the above tables the abbreviation TTTM means too thick to measure.

In the above tables the abbreviation TTTM means too thick to measure.

Upon review of the above representative data, one of skill in the art should observe that well bore fluids formulated according to the teachings of the disclosure substantially inhibit the hydration of various shale clays and thus are likely to provide good performance in drilling subterranean wells encountering such shale clays.

In view of the above disclosure, one of skill in the art should understand and appreciate that one illustrative embodiment of the claimed subject matter includes a water-base wellbore fluid for use in a subterranean well that penetrates through one or more subterranean formations containing a shale which swells in the presence of water. The fluid is formulated to include an aqueous based continuous phase and a shale hydration inhibition agent which is a mixed polycycloaliphatic amine. The shale hydration inhibition agent is present in sufficient concentration to reduce the swelling of shale. In one preferred illustrative embodiment, the shale hydration inhibition agent is the reaction product of a hydrogenation reaction of the product of the reaction of an aromatic amine with formaldehyde. Alternatively, the shale hydration inhibition agent is mixture of aminoalkylcyclohexylanimes and aminoarylcyclohexylamines. In one illustrative embodiment, at least one of the amine functionality groups is functionalized, preferably protonated. The aqueous based continuous phase utilized in the illustrative embodiment is preferably selected from fresh water, sea water, brine, and water soluble organic compounds and mixtures thereof and similar fluids known to one of skill in the art. Conventional additives for wellbore fluids may also be added to the illustrative embodiment including viscosifying agents, rheology control agents, corrosion control agents, weighting agents as well as combinations of these and similar compounds that should be well known to one of skill in the art. In most instances, a weighting material is desired to increase the density of the fluid. Such illustrative weighting agents may be soluble or insoluble in water. In one illustrative embodiment, the weighting agent is selected from the group consisting of barite, calcite, hematite, iron oxide, calcium carbonate, organic and inorganic salts, and mixtures thereof as well as similar compounds that should be well known to one of skill in the art.

Another illustrative embodiment of the claimed invention includes a water-base fluid for use in drilling or completing a subterranean well through one or more subterranean formations containing a shale which swells in the presence of water, in which the well bore fluid includes: an aqueous based continuous phase a weighting agent; and a shale hydration inhibition agent which includes a mixed polycycloaliphatic amine. The illustrative formulation is such that the shale hydration inhibition agent is present in sufficient concentration to reduce the swelling of shale. In one preferred illustrative embodiment, the shale hydration inhibition agent is the reaction product of a hydrogenation reaction of the product of the reaction of an aromatic amine with formaldehyde. Alternatively, the shale hydration inhibition agent is mixture of aminoalkylcyclohexylanimes and aminoarylcyclohexylamines. In one illustrative embodiment, at least one of the amine functionality groups is functionalized, preferably protonated. The aqueous based continuous phase utilized in the illustrative embodiment is preferably selected from fresh water, sea water, brine, and water soluble organic compounds and mixtures thereof and similar fluids known to one of skill in the art. Conventional additives for wellbore fluids may also be added to the illustrative embodiment including viscosifying agents, rheology control agents, corrosion control agents, weighting agents as well as combinations of these and similar compounds that should be well known to one of skill in the art. In most instances, a weighting material is desired to increase the density of the fluid. Such illustrative weighting agents may be soluble or insoluble in water. In one illustrative embodiment, the weighting agent is selected from the group consisting of barite, calcite, hematite, iron oxide, calcium carbonate, organic and inorganic salts, and mixtures thereof as well as similar compounds that should be well known to one of skill in the art.

A further illustrative embodiment of the claimed subject matter includes a water-base well bore fluid that is formulated to include an aqueous based continuous phase; a weighting agent; and a shale hydration inhibition agent having the formula:

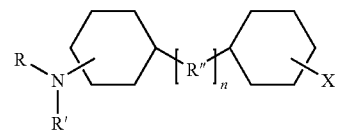

in which R and R' independently selected from hydrogen, methyl, ethyl or propyl, R" is a bridging group having 1 to 20 carbon atoms and n has a value from 1 to 4 and X is an amine, hydroxyl, alkoxy, carboxy group. The illustrative shale hydration inhibition agent is present in sufficient concentration to reduce the swelling of shale. In one preferred illustrative embodiment, the shale hydration inhibition agent is the reaction product of a hydrogenation reaction of the product of the reaction of an aromatic amine with formaldehyde. Alternatively, the shale hydration inhibition agent is mixture of aminoalkylcyclohexylanimes and aminoarylcyclohexylamines. In one illustrative embodiment, at least one of the amine functionality groups is functionalized, preferably protonated. The aqueous based continuous phase utilized in the illustrative embodiment is preferably selected from fresh water, sea water, brine, and water soluble organic compounds and mixtures thereof and similar fluids known to one of skill in the art. Conventional additives for wellbore fluids may also be added to the illustrative embodiment including viscosifying agents, rheology control agents, corrosion control agents, weighting agents as well as combinations of these and similar compounds that should be well known to one of skill in the art. In most instances, a weighting material is desired to increase the density of the fluid. Such illustrative weighting agents may be soluble or insoluble in water. In one illustrative embodiment, the weighting agent is selected from the group consisting of barite, calcite, hematite, iron oxide, calcium carbonate, organic and inorganic salts, and mixtures thereof as well as similar compounds that should be well known to one of skill in the art.

One of skill in the art should further appreciate that the free-base amine shale hydration inhibition agent of the present disclosure may also be utilized as acid salts of the amine. Thus in one illustrative embodiment, there is a water-base wellbore fluid for use in a subterranean well penetrating through one or more subterranean formations containing a shale which swells in the presence of water, in which the fluid is formulated to include: an aqueous based continuous phase; a viscosifying agent; and a shale hydration inhibition agent which is an acid salt of a polycycloaliphatic amine. As with the free base systems the shale hydration inhibition agent is present in sufficient concentration to reduce the swelling of shale. In one illustrative embodiment, the shale hydration inhibition agent is an acid salt of the reaction product of a hydrogenation reaction of the product of the reaction of an aromatic amine with formaldehyde. Alternatively, the shale hydration inhibition agent may be a mixture of compounds selected from the group consisting of: a free-base aminoalkylcyclohexylamine; a free-base aminoarylcyclohexylamine; an acid salt of aminoalkylcyclohexylamine; an acid salt of aminoarylcyclohexylamine and combinations thereof as well as similar such compounds as should be known to one of skill in the art. In forming the acid salt, the acid utilized in one illustrative embodiment is selected from the group consisting of mineral acids, organic acids and combinations thereof. Preferably, the acid utilized to form the acid salt is a C1 to C25 carboxylic acid. As noted above, one of skill in the art should appreciate that by forming the acid salt of the amine functional group, the solubility of the shale hydration inhibition agent in aqueous solutions will be measurably enhanced.

The aqueous based continuous phase utilized in the illustrative embodiment is preferably selected from fresh water, sea water, brine, and water soluble organic compounds and mixtures thereof and similar fluids known to one of skill in the art. Conventional additives for wellbore fluids may also be added to the illustrative embodiment including viscosifying agents, rheology control agents, corrosion control agents, weighting agents as well as combinations of these and similar compounds that should be well known to one of skill in the art. In most instances, a weighting material is desired to increase the density of the fluid. Such illustrative weighting agents may be soluble or insoluble in water. In one illustrative embodiment, the weighting agent is selected from the group consisting of barite, calcite, hematite, iron oxide, calcium carbonate, organic and inorganic salts, and mixtures thereof as well as similar compounds that should be well known to one of skill in the art. When a viscosifying agent is utilized in the formulation of the illustrative fluid, it preferably may be selected from natural and synthetic polymers, and organophilic clay and combinations thereof as well as other viscosifying agents that should be well known to one of skill in the art of well bore fluids.

Alternatively, one illustrative embodiment for the disclosed water-base fluids includes: an aqueous based continuous phase; a weighting agent; and a shale hydration inhibition agent which includes an acid salt of a mixed polycycloaliphatic amine. As with the free base systems the shale hydration inhibition agent is present in sufficient concentration to reduce the swelling of shale. In one illustrative embodiment, the shale hydration inhibition agent is an acid salt of the reaction product of a hydrogenation reaction of the product of the reaction of an aromatic amine with formaldehyde. Alternatively, the shale hydration inhibition agent may be a mixture of compounds selected from the group consisting of: a free-base aminoalkylcyclohexylamine; a free-base aminoarylcyclohexylamine; an acid salt of aminoalkylcyclohexylamine; an acid salt of aminoarylcyclohexylamine and combinations thereof as well as similar such compounds as should be known to one of skill in the art. In forming the acid salt, the acid utilized in one illustrative embodiment is selected from the group consisting of mineral acids, organic acids and combinations thereof. Preferably, the acid utilized to form the acid salt is a C1 to C25 carboxylic acid. As noted above, one of skill in the art should appreciate that by forming the acid salt of the amine functional group, the solubility of the shale hydration inhibition agent in aqueous solutions will be measurably enhanced.

The aqueous based continuous phase utilized in the illustrative embodiment is preferably selected from fresh water, sea water, brine, and water soluble organic compounds and mixtures thereof and similar fluids known to one of skill in the art. Conventional additives for wellbore fluids may also be added to the illustrative embodiment including viscosifying agents, rheology control agents, corrosion control agents, weighting agents as well as combinations of these and similar compounds that should be well known to one of skill in the art. In most instances, a weighting material is desired to increase the density of the fluid. Such illustrative weighting agents may be soluble or insoluble in water. In one illustrative embodiment, the weighting agent is selected from the group consisting of barite, calcite, hematite, iron oxide, calcium carbonate, organic and inorganic salts, and mixtures thereof as well as similar compounds that should be well known to one of skill in the art. When a viscosifying agent is utilized in the formulation of the illustrative fluid, it preferably may be selected from natural and synthetic polymers, and organophilic clay and combinations thereof as well as other viscosifying agents that should be well known to one of skill in the art of well bore fluids.

In a further illustrative embodiment of the water-base well bore fluids disclosed herein, the fluid is formulated to include: an aqueous based continuous phase; a weighting agent; and a shale hydration inhibition agent having the formula:

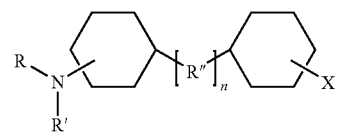

in which R and R' independently selected from hydrogen, methyl, ethyl or propyl, R" is a bridging group having 1 to 20 carbon atoms and n has a value from 1 to 4 and X is an amine, hydroxyl, alkoxy, carboxy group, in which at least one of the amine functional groups have been reacted with a predetermined amount of C1 to C25 carboxylic acid. As with the free base systems the shale hydration inhibition agent is present in sufficient concentration to reduce the swelling of shale.

The aqueous based continuous phase utilized in the illustrative embodiment is preferably selected from fresh water, sea water, brine, and water soluble organic compounds and mixtures thereof and similar fluids known to one of skill in the art. Conventional additives for wellbore fluids may also be added to the illustrative embodiment including viscosifying agents, rheology control agents, corrosion control agents, weighting agents as well as combinations of these and similar compounds that should be well known to one of skill in the art. In most instances, a weighting material is desired to increase the density of the fluid. Such illustrative weighting agents may be soluble or insoluble in water. In one illustrative embodiment, the weighting agent is selected from the group consisting of barite, calcite, hematite, iron oxide, calcium carbonate, organic and inorganic salts, and mixtures thereof as well as similar compounds that should be well known to one of skill in the art. When a viscosifying agent is utilized in the formulation of the illustrative fluid, it preferably may be selected from natural and synthetic polymers, and organophilic clay and combinations thereof as well as other viscosifying agents that should be well known to one of skill in the art of well bore fluids.

It should be appreciated that the use of the fluids disclosed herein is also within the scope of the contemplated invention. Thus one illustrative embodiment includes a method of disposing of drill cuttings into a subterranean formation utilizing the fluids disclosed herein. In one such method, the process includes: grinding the drill cuttings in a water-base fluid to form a slurry, in which the water based fluid includes: an aqueous based continuous phase and a shale hydration inhibition agent which includes an acid salt or free-base of a mixed polycycloaliphatic amine. The shale hydration inhibition agent should present in sufficient concentration to reduce the swelling of shale. The slurry thus formed is injected into the subterranean formation for disposal purposes.

Further it should be appreciated that the disclosed subject matter includes methods for utilizing the disclosed fluids in the drilling and completion of a subterranean well. Thus, one illustrative embodiment of the claimed subject matter includes: conducting drilling or completing operations in a subterranean well that penetrates through one or more subterranean formations containing a shale which swells in the presence of water, wherein the conduct is carried out in the presence of a well bore fluid, wherein the well bore fluid includes: an aqueous based continuous phase; and a shale hydration inhibition agent which includes the acid salt or free-base form of a mixed polycycloaliphatic amine. The shale hydration inhibition agent is present in sufficient concentration to reduce the swelling of shale encountered in the operation.

While the compositions and methods of this claimed subject matter have been described in terms of preferred embodiments, it will be apparent to those of skill in the art that variations may be applied to the process described herein without departing from the concept and scope of the claimed subject matter. All such similar substitutes and modifications apparent to those skilled in the art are deemed to be within the scope and concept of the claimed subject matter as it is set out in the following claims.

What is claimed is:

1. A method comprising
    conducting drilling or completing operations in a subterranean well that penetrates through one or more subterranean formations containing a shale which swells in the presence of water, wherein the conduct is carried out in the presence of a well bore fluid, wherein the well bore fluid includes:
    an aqueous based continuous phase; and
    a shale hydration inhibition agent having the formula:

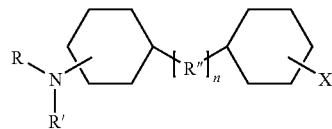

in which R and R' independently selected from hydrogen, methyl, ethyl or propyl, R" is a bridging group having 1 to 20 carbon atoms and n has a value from 1 to 4 and X is an amine, hydroxyl, alkoxy, carboxy group, in which at least one of the amine functional groups have been reacted with a predetermined amount of C1 to C25 carboxylic acid; and
    wherein the shale hydration inhibition agent has a concentration range from about 0.5 to about 20 pounds per barrel.

2. The method of claim 1 wherein the shale hydration inhibition agent is mixture of compounds selected from the group consisting of: a free-base aminoalkylcyclohexylamine; a free-base aminoarylcyclohexylamine; an acid salt of aminoalkylcyclohexylamine; an acid salt of aminoarylcyclohexylamine and combinations thereof.

3. The method of claim 1 wherein the aqueous based continuous phase is selected from: fresh water, sea water, brine, and water soluble organic compounds and mixtures thereof.

4. The method of claim 1 further comprising a viscosifying agent.

5. The method of claim 1 further comprising a weighting material selected from the group consisting of barite, calcite, hematite, iron oxide, calcium carbonate, organic and inorganic salts, and mixtures thereof.

6. The method of claim 1 wherein the acid utilized to form the acid salt is selected from the group consisting of mineral acids, organic acids and combinations thereof.

7. The method of claim 1 wherein the acid utilized to form the acid salt is a C1 to C25 carboxylic acid.

* * * * *